UNITED STATES PATENT OFFICE.

HERMANN FRITZSCHE, OF BASEL, SWITZERLAND, ASSIGNOR TO SOCIETY OF CHEMICAL INDUSTRY IN BASLE, OF BASEL, SWITZERLAND.

AZODYESTUFFS DYEING MORDANTED GOODS.

1,325,841.      Specification of Letters Patent.      Patented Dec. 23, 1919.

No Drawing. Original application filed June 7, 1918, Serial No. 238,779. Divided and this application filed December 14, 1918. Serial No. 266,805.

*To all whom it may concern:*

Be it known that I, HERMANN FRITZSCHE, a citizen of the Swiss Republic, and resident of Basel, Switzerland, have invented new Azodyestuffs Dyeing Mordanted Goods, of which the following is a full, clear, and exact specification.

This application is a divisional one of my application for Letters Patent Ser. No. 238779 filed June 7th, 1918.

I have found that new azodyestuffs dyeing mordanted goods can be derived from the diazotation products of the amids and imids of the aminoorthooxyarylsulfonic acids that is to say of derivatives of ammonia corresponding to the general formula

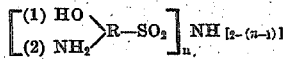

wherein R stands for an aryl radical which may be further substituted and $n$ for a whole number inferior to 3, that is to say for 1 or 2 by combining the said diazotation products with a compound able to be combined with diazobodies.

The amids and imids of amino-orthooxyarylsulfonic acids corresponding to the above formula can be obtained by acting on the chlorids of halogennitroarylsulfonic acids containing the nitro group in position "ortho" relatively to the halogen with ammonia, or with amids of halogen-orthonitroarylsulfonic acids, substituting a hydroxyl group for the halogen in the condensation products thus obtained by acting thereupon with alkalis, and by reducing the resulting nitrooxybodies.

The preparation of the parent materials employed for the production of the new azodyestuffs is illustrated by the following examples 1 and 2 and their transformation into azodyestuffs by the following examples 3 and 4.

*Example 1. Preparation of 1-oxy-2-aminobenzene-4-sulfamid.*

255 gr. of 1-chloro-2-nitrobenzene-4-sulfochlorid are poured into 50 ccm. of aqueous ammonia of 20 per cent. and the mixture is evaporated on a water bath. The residue is extracted with water, neutralized with hydrochloric acid and the difficultly soluble amid is separated by filtration. It is boiled for 3 hours with a solution of 12 gr. soda-lye in 150 ccm. water, whereby the hydroxyl group is substituted for the chlorin. After neutralization of the reaction mass with hydrochloric acid until all reaction on phenolphthalein paper disappears, a solution of 40 gr. of crystallized sodium sulfid is added and the mixture is boiled until an entire discoloration of the yellow solution has taken place, which occurs after about 2 hours. By acidifying with hydrochloric acid, boiling and filtering from the separated sulfur, a solution of 1-oxy-2-aminobenzene-4-sulfamid is obtained, from which the base can be isolated by neutralization and precipitation with common salt. The solution obtained can also be employed directly for the preparation of the dyestuffs.

*Example 2. Preparation of the imid of the 2-amino-1-oxybenzene-4-sulfonic acid.*

255 gr. of 1-chloro-2-nitrobenzene-4-sulfochlorid are mixed with 200 gr. of ammonium carbonate and the mixture is heated for 5 hours on a water bath. The originally viscous mass becomes hereby powdery. The amid is freed from the admixed salts by a treatment with water. 236 gr. of the 1-chloro-2-nitrobenzene-4-sulfamid thus obtained, 255 gr. of 1-chloro-2-nitrobenzene-4-sulfo-chlorid and 200 gr. sodium acetate free of water are mixed and heated together for 1 hour, on a common salt bath, while stirring.

The melted mass obtained is dissolved in 3000 ccm. water; on cooling or more completely on addition of common salt the 1:1'-dichloro-2:2'-dinitrodibenzene-4:4'-disulfonimid separates. 465 gr. of this latter are boiled for 3 hours in 2000 ccm. of an aqueous solution of 200 gr. of soda lye, whereby the substitution of the hydroxyl groups for the atoms of chlorin is effected. After hydrochloric acid has been added to the reaction mass until disappearance of the phenolphthaleinalkaline reaction, a solution of 900 gr. of crystallized sodium sulfid is added at 60° C. and the solution boiled until its entire discoloration is effected. Hereafter it is acidified with hydrochloric acid and the sulfurous acid formed is expelled by boiling. The base is partly in solution, partly in the separated precipitate and is extracted from this latter with hydrochloric acid. From the united hydrochloric solutions the hydrochlorid of the imid of 2-amino-1-oxybenzene-4-sulfonic acid crystallizes after addition of common salt.

*Example 3.*

18.7 parts of the 1-oxy-2-amidobenzene-4-sulfamid (prepared according to example 1) are diazotized with 25 parts of hydrochloric acid of 30 per cent. and 7.2 parts of sodium nitrite at 5 to 10° C., and the resulting solution of diazobody is poured into a solution of 24.6 parts of 2-oxy-naphthalene-6-sulfonic acid and of 30 parts of sodium carbonate. After 12 hours the dyestuff formed is precipitated by addition of common salt and filtered off.

It corresponds to the formula:

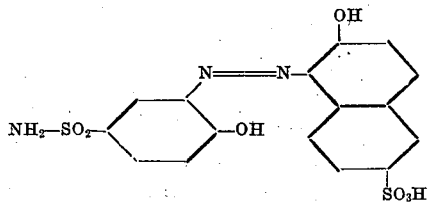

Its sodium salt constitutes a brown-red powder soluble in water with bluish-red coloration and in concentrated sulfuric acid with orange coloration and dyes wool in an acid bath brownish-orange tints turning by subsequent coppering (treatment with a solution of copper salt) to a bluish-red fast to washing and to light and by subsequent chromating (treatment with a solution of bichromate) to a dark violet very fast to washing, fulling, potting and to light.

*Example 4.*

35.9 parts of the imid of the 2-amino-1-oxybenzene-4-sulfonic acid (prepared according to example 2) are tetrazotized in the usual manner with 14.4 parts of sodium nitrite. The resulting tetrazo-compound, which precipitates in the form of yellow crystals is poured into a solution of 29 parts of betanaphthol and of 60 parts of sodium carbonate, made alkaline with soda lye. After 12 hours the dyestuff is isolated in the usual manner.

It constitutes a dark red powder, dissolving in water and in concentrated sulfuric acid to bluish-red colorations and dyeing wool in an acid bath red tints turning on subsequent coppering to a bluish-red fast to washing and to light and on subsequent chromating to a violet very fast to washing, fulling and potting and light.

What I claim is:

1. As new products the herein described azodyestuffs dyeing on mordants, derived from the product of diazotation of the bodies corresponding to the formula

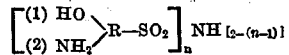

wherein R stands for an aryl radical, which may be further substituted, and $n$ for a whole number inferior to 3, and from a compoundable to be combined with diazobodies, the said dyestuffs being in a dry state yellow to dark colored powders, which dissolve in water and concentrated sulfuric acid with yellow to violet colorations, and dye wool in an acid bath yellow to blue-violet tints turning on subsequent coppering to greenish-yellow to blue tints fast to washing and to light and on subsequent chromating to yellow to black tints fast to washing, fulling, potting and light.

2. As new products the herein described azodyestuffs dyeing on mordants, resulting from the combination of the diazoderivatives of the amids of the 2-amino-1-oxyaryl-4-sulfonic acids with sulfonated oxyderivatives of naphthalene, able to be combined with diazobodies, the said dyestuffs being in a dry state yellow-red to red-brown powders, which dissolve in water with red to brown-red colorations and in concentrated sulfuric acid with orange to violet colorations and dye wool in an acid bath yellow-red to Bordeaux-red tints turning on subsequent coppering to blue-red to violet tints fast to washing and to light and on subsequent chromating to red-violet to reddish-blue tints fast to washing, fulling, potting and light.

3. As new product, the herein described azodyestuff dyeing on mordants corresponding to the formula

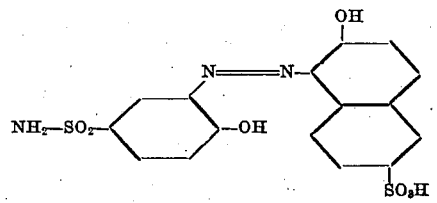

and derived from the diazoderivative of the amid of 2-amino-1-ozybenzene-4-sulfonic acid and 2-oxynaphthalene-6-sulfonic acid, the said dyestuff constituting in the form of its sodium salt a brown-red powder soluble in water with bluish-red coloration and in concentrated sulfuric acid with orange coloration and dyes wool in an acid bath brownish orange tints turning on subsequent coppering to a bluish-red fast to washing and to light and by subsequent chromating to a dark violet very fast to washing, fulling, potting and light.

In witness whereof I have hereunto signed my name this 11th day of November, 1918, in the presence of two subscribing witnesses.

HERMANN FRITZSCHE.

Witnesses:
HELGE FRIES,
AMAND BRAUN.